United States Patent
Lamoncha

(10) Patent No.: US 11,964,437 B1
(45) Date of Patent: Apr. 23, 2024

(54) ADDITIVE MANUFACTURING BY SOLVENT MELDING OF BUILD MATERIAL

(71) Applicant: Mark Lamoncha, Columbiana, OH (US)

(72) Inventor: Mark Lamoncha, Columbiana, OH (US)

(*) Notice: Subject to any disclaimer, the term of this patent is extended or adjusted under 35 U.S.C. 154(b) by 0 days.

(21) Appl. No.: 17/706,977

(22) Filed: Mar. 29, 2022

Related U.S. Application Data

(60) Provisional application No. 63/167,829, filed on Mar. 30, 2021.

(51) Int. Cl.
| | |
|---|---|
| B29C 64/165 | (2017.01) |
| B29C 64/209 | (2017.01) |
| B29C 64/393 | (2017.01) |
| B33Y 10/00 | (2015.01) |
| B33Y 30/00 | (2015.01) |
| B33Y 50/02 | (2015.01) |

(52) U.S. Cl.
CPC .......... *B29C 64/393* (2017.08); *B29C 64/165* (2017.08); *B29C 64/209* (2017.08); *B33Y 10/00* (2014.12); *B33Y 30/00* (2014.12); *B33Y 50/02* (2014.12)

(58) Field of Classification Search
CPC ............... B29C 64/153; B29C 64/165; B29C 64/214–218; B29C 64/386–393; B29C 64/364; B29C 64/371; B33Y 50/00–02
See application file for complete search history.

(56) References Cited

U.S. PATENT DOCUMENTS

| | | | |
|---|---|---|---|
| 9,950,366 B2 | 4/2018 | Ackelid | |
| 10,144,175 B2 | 12/2018 | Batchelder | |
| 10,207,325 B2 | 2/2019 | Zink et al. | |
| 10,385,478 B2 | 8/2019 | De Palo et al. | |
| 10,421,124 B2 | 9/2019 | Jepeal et al. | |
| 10,751,987 B2 | 8/2020 | Swartz et al. | |
| 10,773,268 B2 | 9/2020 | Hascoet et al. | |
| 10,792,908 B2 | 10/2020 | Batchelder et al. | |
| 10,800,094 B2 | 10/2020 | Rolland et al. | |
| 10,800,154 B2 | 10/2020 | Adams et al. | |
| 10,864,676 B2 | 12/2020 | Constantinou et al. | |

(Continued)

OTHER PUBLICATIONS

Vidyarthi, Nita & Palit, Santi R., Dissolution of Polyethylene in a Mixture of Two Nonsolvents, Journal of Polymer Science: Polymer Chemistry Edition, 1980, vol. 18, pp. 3315-3317, John Wiley & Sons, Inc.

Gardiner, Stephen, Best Practices for Solvent Welding Thermoplastic Piping: PVC, CPVC, and ABS, Weld-On PS Corporation, 2008, 10 pgs., IPS Corporation.

Tsao, Chen-Wen & Devoe, Don L., Bonding of Thermoplastic Polymer Microfluidics, Nov. 13, 2008, 16 pgs., Springer-Verlag.

(Continued)

*Primary Examiner* — Philip C Tucker
*Assistant Examiner* — Andrew L Swanson
(74) *Attorney, Agent, or Firm* — Standley Law Group LLP; Jeffrey S. Standley; Adam J. Smith

(57) ABSTRACT

Systems and methods for printing a manufacturing object using solvent melding by additive manufacturing are provided. Build data is uploaded to a controller for creating the manufacturing object. A recoater individually deposits multiple layers of granulized build material within a build box. A printhead deposits a solvent configured to meld the build material at respective areas of the multiple layers in accordance with said build data following deposit of each of the multiple layers of the build material within the build box.

16 Claims, 2 Drawing Sheets

(56) References Cited

U.S. PATENT DOCUMENTS

| | | | |
|---|---|---|---|
| 2008/0211132 A1* | 9/2008 | Feenstra | B22F 10/73 |
| | | | 264/113 |
| 2015/0053345 A1 | 2/2015 | Schroer et al. | |
| 2015/0165649 A1 | 6/2015 | Broeska et al. | |
| 2016/0333165 A1 | 11/2016 | Bayer et al. | |
| 2017/0106595 A1* | 4/2017 | Günther | B33Y 40/00 |
| 2018/0009165 A1* | 1/2018 | Agawa | B29C 64/393 |
| 2018/0345576 A1* | 12/2018 | Constantinou | B32B 5/245 |
| 2019/0009332 A1 | 1/2019 | Rockstroh | |
| 2019/0024251 A1 | 1/2019 | Li et al. | |
| 2019/0054527 A1 | 2/2019 | Natarajan et al. | |
| 2019/0084046 A1 | 3/2019 | Swartz et al. | |
| 2019/0348202 A1 | 11/2019 | Sachdev et al. | |
| 2020/0061706 A1 | 2/2020 | Gibson et al. | |
| 2020/0101659 A1 | 4/2020 | Prakash et al. | |
| 2020/0206812 A1* | 7/2020 | Aotani | B22F 10/10 |
| 2020/0216363 A1 | 7/2020 | Saito et al. | |
| 2020/0247914 A1 | 8/2020 | Casalini et al. | |
| 2021/0280982 A1* | 9/2021 | Karch | H05K 9/0088 |

OTHER PUBLICATIONS

Ahmad Dar, Shakeel, Ahmad Dar, Showkat, Alam, Mahmood, Dwivedi, Abhishek, & Saquib, Md, Comparative Weld-Able Plastics, International Journal for Scientific Research & Development, Jan. 2016, 5 pgs., vol. 4, Issue 2, ISSN (online): 2321-0613.

Walleser, Mitch, How to Remove 3D Printing Support Material Faster and Improve Final Quality, https://blog.gotopac.com, Feb. 28, 2018, 14 pgs., Production Automation Corporation (PAC), Minnetonka, MN.

Kozak, Jersey & Zakrzewski, Tomasz, Accuracy Problems of Additives Manufacturing Using SLS/SLM Processes, AIP Conference Proceedings 2017, 020010, Oct. 1, 2018, 13 pgs., AIP Publishing.

Parmar, Jainum, Cold Spray Method for Coatings and Additive Manufacturing, https://matmatch.com/blog, Feb. 18, 2020, 17 pgs., Matmatch.

Matterhackers, 3D Gloop! 3D Printer Adhesives, https://www.matterhackers.com/store, Feb. 2, 2021, 4 pgs., MatterHackers.

Delta Engineering, PP Polypropylene, https://delta-engineering.be/pp, Mar. 4, 2021, 7 pgs., Delta Engineering.

Illumarco, AE12 Binder Jetting—Dense Plastic Parts Produced in Binder Jetting Technology, article, Dec. 14, 2016, 5 ages.

* cited by examiner

ADDITIVE MANUFACTURING BY SOLVENT MELDING OF BUILD MATERIAL

CROSS-REFERENCE TO RELATED APPLICATIONS

This application claims the benefit of U.S. provisional patent application Ser. No. 63/167,829 filed Mar. 30, 2021, the disclosures of which are hereby incorporated by reference as if fully restated herein.

TECHNICAL FIELD

Exemplary embodiments relate generally to systems and methods for solvent melding of build material in additive manufacturing.

BACKGROUND AND SUMMARY OF THE INVENTION

Additive manufacturing has become an increasingly popular alternative to traditional, subtractive manufacturing. As additive manufacturing, such as 3-D printing, becomes more widely used, the need for systems and methods of additive manufacturing incorporating a broad range of build material, such as plastics, at lower operating costs without sacrificing accuracy and consistency has increased.

One exemplary type of additive manufacturing is binder jetting. In binder jetting, a build material, traditionally sand or aggregate, is generally deposited within a build box. The build material may be pre-deposited, or a print head may deposit the build material, often in a layer-by-layer manner. The build material may be premixed with an activator or the print head may deposit an activator over the deposited material. The activator may be allowed to soak through the deposited build material. The print head subsequently deposits a binder where the resulting object is to be formed. Generally, traditional binders are resins ("resin binding"). The binder may be activated by the activator and cause the surrounding build material to be bonded to form a portion of the object.

Typically, a build platform is lowered after each layer of binder is deposited and additional build material is deposited by a recoater. Subsequent layers of the binder are deposited where the portions of the object forming the next layer are located. The process is repeated to form the entire object. Once all layers have been completed, the object is excavated. Examples of such additive manufacturing machines are those made by ExOne of North Huntington, Pennsylvania (https://www.exone.com/). Such additive manufacturing processes and machines may be used in the foundry industry to create sand cores, such as for use with subsequent casting efforts, for example.

There are several issues with traditional binder jetting methods. The binder may harden before being deposited ("pre-deposition hardening") if the binder is not properly mixed, is exposed to ambient air, or is not stored at a proper temperature. Pre-deposition hardening may prevent the binder from being transported from a binder source to the build material. Additionally, if the binder is exposed to moisture before being deposited, the binder may not cure properly after deposit, and as a result, the object may suffer from structural deformities. Furthermore, the use of resins with traditional binder jetting generally requires that specific activators also be used for bonding to occur properly. If there is an issue with either the resin or the activator (e.g., pre-deposition hardening, moisture exposure), or if the activator is not tailored for use with that specific resin, proper bonding may not occur. In addition, traditional binder jetting is generally limited to metal, sand, or ceramic granule build material, but not plastic granule build material. This is at least in part because the low porosity of plastic restricts infiltration of binders and activators. The traditional binder jetting build material may be more expensive than plastic, and/or objects constructed from the traditional binder jetting build material may lack the structural integrity or other desirable properties that plastic versions of the objects may afford.

Another known additive manufacturing practice is laser sintering in 3-D printing. With laser sintering, a pulsed laser sinters powdered material together to form a solid structure, or solidifies a liquid photopolymer to form a solid structure. Unlike binder jetting, laser sintering often involves the use of plastic build material. A major issue with laser sintering is that the manufactured objects often experience deformation during the cooling process. Deformation may occur when an object experiences significant temperature inconsistency. A portion of the object having an elevated temperature, such as immediately after beam exposure, may create tension with respect to one or more cooler portions of the object. The one or more cooler portions of the object may be drawn towards the portion having an elevated temperature by tensile strain, which may result in an object deformity. Another issue with laser sintering is that a significant amount of electricity is required to operate the laser, thus its operating costs and environmental impact may be higher than that of binder jetting.

Systems and methods are disclosed for melding build material, including granulized plastic, in an additive manufacturing fashion without the use of laser sintering or traditional binder jetting. Exemplary embodiments of the present invention provide for melding build material, including granulized plastic, in additive manufacturing using one or more solvents. Exemplary embodiments of the present invention may be used to manufacture a variety of plastic or hybrid (comprising plastic material in addition to at least some non-plastic material) objects, including, but not limited to, plastic or hybrid household goods, lab equipment, medical devices and/or industrial tools to name a few examples, without limitation. Certain exemplary embodiments of the present invention may also be used to produce plastic or hybrid equipment and/or cores for casting and/or molding processes as further non-limiting examples.

In an exemplary embodiment of the present invention, granulized plastic and/or granulized hybrid build material may be deposited within a build box. The build material may comprise one or more thermoplastics such as polyethylene, PVC, ABS and/or polypropylene. The build material may also comprise a mixture of one or more thermoplastics with one or more non-plastic filaments, such as wood powder, metal powder and/or sand. The build material may be pre-deposited, or a print head may deposit the build material, often in a layer-by-layer manner.

In certain exemplary embodiments, the build material may be premixed with a primer before being deposited. Exemplary primers, for example, commercial PVC primer, may enhance the ability of one or more solvents to fuse build material. In other exemplary embodiments, the print head may deposit a primer over the deposited material. The primer may be allowed to soak through the deposited build material before a print head subsequently deposits one or more solvents over a portion of the build material desired to be fused ("targeted build material"). In yet other embodiments, one or more solvents are deposited over the build material without the use of a primer.

In exemplary embodiments of the present invention, one or more solvents may be introduced to the build material to meld a plurality of granules into one or more desired shapes or structures or otherwise fuse the plurality of granules. Molecular forces of attraction between one or more solvents and one or more polymers may cause solvent molecules to break up polymer bonds of each outer surface layer of each granule amongst certain targeted build material (collectively "targeted granules"). As a result, solvent molecules may penetrate the outer surface layer of each targeted granule, and a solvated layer may form between the one or more solvents and each targeted granule interior. Polymer chains may become diffusible across each solvated layer, and polymer chains from adjacent granules may interwind with one another. Solvent molecules may continue to penetrate each targeted granule until each solvated layer reaches a stationary state. The stationary state may occur when the concentration of suspended polymer chains at or near each outer surface layer of each granule becomes too high for additional dissolution of the granule to occur, and/or the one or more solvents have evaporated or otherwise been removed from the build material. Following evaporation or other removal of the one or more solvents from the build material, interwound polymer chains from adjacent granules may define a continuous, smooth unitary connection between said granules, where said granules have melded to form a unitary portion of a structure.

An exemplary solvent may comprise one or more chemicals collectively and/or independently having an ability to dissolve one or more thermoplastics at temperatures well below the melting point of said one or more thermoplastics. In certain preferred embodiments, an exemplary solvent may comprise one or more of carbon tetrachloride, decalin, trichloroethylene, cyclohexane, toluene, xylene, or one or more of the forgoing chemicals dissolved in a separate medium. In other preferred embodiments, an exemplary solvent may be a bodied solvent comprising a mixture of thermoplastic material and one or more of carbon tetrachloride, decalin, trichloroethylene, cyclohexane, toluene, xylene, or one or more of the forgoing chemicals dissolved in a separate medium.

In exemplary embodiments of the present invention, one or more print heads may deposit one or more solvents over the targeted build material one or more times before additional build material is deposited. The one or more solvents may be applied in vapor form to reduce the likelihood of having object deformities caused by excessive granule dissolution. In some embodiments, a sensor may indicate when melding occurs in targeted build material after solvent introduction. The sensor may be electronically linked to a controller, where said controller is electronically linked to a control device. The controller may be configured to instruct the control device to cause additional solvent to be deposited over targeted build material if melding does not occur after a set amount of time following initial solvent application.

The same or a different controller may be configured to instruct the control device to cause additional build material to be deposited over a build platform by one or more print heads or other devices, such as after a stationary state has been reached in the targeted build material, and thereafter the build platform may be lowered. In some embodiments, one or more sensors may signal the controller when the stationary state has been reached in the targeted build material. Alternatively, or additionally, additional build material may be deposited over the build platform by one or more print heads or other devices after a set amount of time following solvent application. Additional layers of the solvent may be deposited where the portions of the object forming the next layer are located over the entire build area. The process is repeated to form the entire object. Once all layers have been completed, the object may be excavated. Such excavation typically involves digging, blowing away, grinding, breaking apart, or the like.

In exemplary embodiments of the present invention, a build box temperature unit may control the temperature of the build box. The temperature of the build box may influence the solvent evaporation rate and the magnitude of molecular force of attraction between granule and solvent molecules. The build box temperature unit may be electronically linked to an exemplary controller. The controller may instruct the build box temperature unit to increase or decrease the temperature of the build box based on data from one or more exemplary sensors. For example, if targeted build material has not reached a stationary state after a certain amount of time following solvent introduction, the controller may instruct the build box temperature unit to increase the temperature of the build box to increase the evaporation rate of one or more solvents. The build box temperature may preferably be maintained below the melting point of the build material ("cold fusion setting") so as to prevent deformation of the one or more objects being manufactured. The controller may further be configured to direct a control device to adjust pressure applied to the build material. For example, increasing pressure on targeted build material after solvent deposit may increase the strength of the bonds between granules forming a unitary structure. Other conditions within the build box relevant to optimal melding may, alternatively or additionally, be measured. These conditions may include, but are not necessarily limited to, air pressure and humidity. Concentration of the solvent may be adjusted based on measured conditions.

In some preferred embodiments of the present invention, a diluent may be added to the solvent before the solvent is deposited over the build material. This may aid with inhibiting channel deformation caused by excessive granule dissolution. In other embodiments, without limitation, a diluent may be added to the build material after the solvent is deposited over the build material to inhibit excessive granule dissolution. In certain embodiments, the diluent may comprise ethanol and/or water. Alternatively, or additionally, airflow may be directed over some or all of the build material to enhance solvent evaporation. Furthermore, in some preferred embodiments, the controller may be configured to cause diluent to be added or airflow to be directed to the targeted build material when it has not reached a stationary state after a set amount of time following solvent application. Certain exemplary embodiments may include a computer-aided design (CAD) model as a template dictating where one or more print heads deposit primer, solvent and/or diluent over the deposited material.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENTS

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein, but are to include deviations in shapes that result, for example, from manufacturing.

Figure 1:
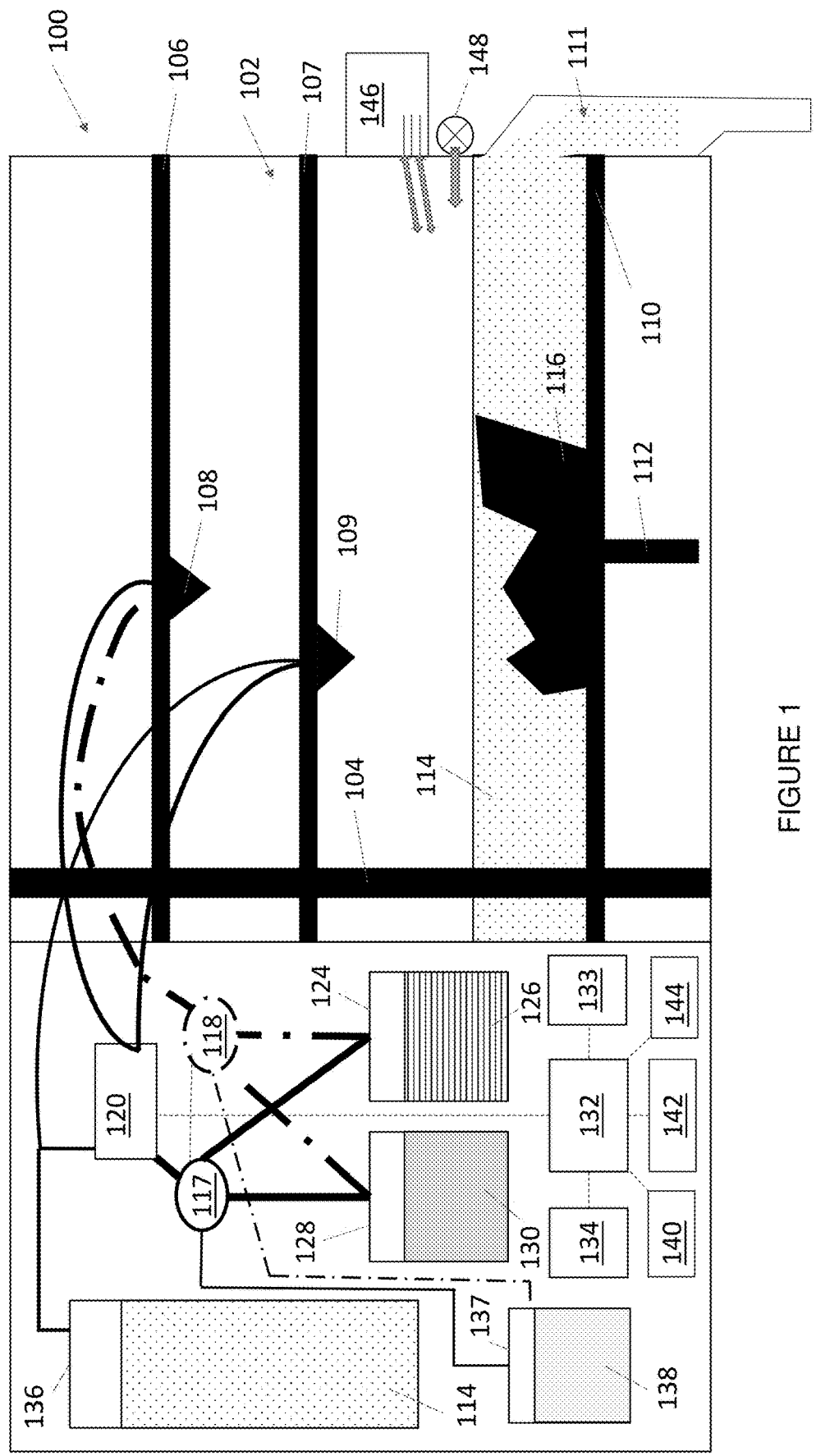
FIG. 1 is a front view of an exemplary additive manufacturing machine in accordance with the present invention.

Referring to FIG. 1, an exemplary additive manufacturing machine 100 may include one or more features configured to facilitate solvent melding of build material 114 in accordance with the present invention. The machine 100 may be a 3-D printer, though such is not required, as any type of additive manufacturing and corresponding equipment may be utilized.

The machine 100 may comprise a build box 102. The build box 102 may be any size or shape. A vertical movement device 104 may be located within the build box 102. A horizontal movement device 106 may be located within the build box 102. A deposit device 108 may be mounted to the horizontal movement device 106. In the embodiment shown, the deposit device 108 is a print head, though any type or kind of deposit device 108 may be utilized. The horizontal movement device 106 may be connected to the vertical movement device 104. In other exemplary embodiments, the deposit device 108 may be mounted to the vertical movement device 104 and the vertical movement device 104 may be mounted to the horizontal movement device 106. The vertical movement device 104 may be configured to control vertical movement of the horizontal movement device 106 and/or the deposit device 108. The horizontal movement device 106 may be configured to control horizontal movement of the vertical movement device 104 and/or the deposit device 108. For example, without limitation, the vertical and horizontal movement devices 104 and 106 may comprise tracks, motors, belts, gears, some combination thereof, or the like. The deposit device 108 may comprise a nozzle, a print head, a valve, some combination thereof, or the like.

The machine 100 may comprise a recoater 109. In the embodiment shown, the recoater 109 is a print head, though any type or kind of recoater 109 may be utilized. The recoater 109 may be mounted to a second horizontal movement device 107. The second horizontal movement device 107 may be mounted to the vertical movement device 104, though in other exemplary embodiments the second horizontal movement device 107 may be mounted to a second, and independent vertical movement device. In other exemplary embodiments, the recoater 109 may be mounted to the vertical movement device 104, or the second independent vertical movement device, which may be mounted to the second horizontal movement device 107. The second horizontal movement device 107 may comprise tracks, motors, belts, gears, some combination thereof, or the like. The recoater 109 may comprise a nozzle, a print head, a valve, some combination thereof, or the like.

The recoater 109 may be in fluid communication with a build material reservoir 136. In other exemplary embodiments, the deposit device 108 may be in fluid communication with the build material reservoir 136. In such embodiments, the recoater 109 may not be required as the deposit device 108 may essentially serve as the recoater 109. The build material reservoir 136 may be configured to hold a build material 114 of various kind or type. The build material 114 may comprise, for example, without limitation, plastic or hybrid granules. Plastic granules may comprise one or more thermoplastics including, but not limited to, polyethylene, PVC, ABS, and/or polypropylene. Hybrid granules may comprise a mixture of one or more thermoplastics with one or more non-plastic filaments, including, but not limited to, wood powder, metal powder, and/or sand. The build material 114 may be melded to form, for example, plastic or hybrid material objects, such as, but not limited to, household goods, lab equipment, medical devices and/or industrial tools, to name a few examples, without limitation. The build material 114 may also be melded to form equipment and/or cores for casting and/or molding processes as additional non-limiting examples.

A build platform 110 may be located within the build box 102. The build platform 110 may be connected to a platform movement device 112 which may permit vertical and/or horizontal movement of the build platform 110. The platform movement device 112 may comprise tracks, motors, belts, gears, some combination thereof, or the like. In exemplary embodiments, the build platform 110 may have substantially the same footprint as the build box 102, though any size or shape may be utilized.

The deposit device 108 may be in fluid communication with a first reservoir 124. The first reservoir 124 may be configured to hold a primer 126. The primer 126 may enhance the ability of one or more solvents 130 to fuse the build material 114. For example, where build material 114 comprises PVC, an exemplary commercial PVC primer may penetrate and dissolve a portion of each targeted granule, thus increasing the amount each targeted granule dissolves, and the overall dissolution rate when acting together with one or more exemplary solvents.

A control device 118 may be interposed between the first reservoir 124 and the deposit device 108. The control device 118 may be configured to control a volume, concentration, or other amount of primer 126 to be deposited over the build material 114 on build platform 110. The first reservoir 124 may, alternatively or additionally, be in fluid communication with a mixing chamber 120. A control device 117 may be interposed between the first reservoir 124 and a print head 108, 109. Primer 126 may be mixed with build material 114 in the mixing chamber 120 prior to deposit, and the control device 117 may control the volume, concentration, or other amount of primer 126 to be mixed with build material 114 in the mixing chamber 120, by way of non-limiting example. The mixing chamber 120 may comprise one or more heating elements, cooling elements, mixing devices, some combination thereof, or the like.

The deposit device 108 may be in fluid communication with a second reservoir 128. The second reservoir 128 may be configured to hold an exemplary solvent 130. In other embodiments, multiple solvent reservoirs may be included, permitting multiple solvents to be added to targeted build material. In certain preferred embodiments, print heads 108, 109 deposit solvent 130 over build material 114 on build platform 110 as a liquid or vaporized mist to reduce the likelihood of having object deformities caused by excessive granule dissolution. The print head(s) 108, 109 may comprise one or more atomizers or the like.

The control device 118 may, alternatively or additionally, be interposed between the second reservoir 128 and the deposit device 108. The control device 118 may be configured to control a volume, concentration, or other amount of solvent 130 to be deposited over the build material 114 on build platform 110. The second reservoir 128 may, alternatively or additionally, be in fluid communication with the mixing chamber 120. The control device 117 may, alternatively or additionally, be interposed between the second reservoir 128 and a print head 108, 109. Solvent 130 may be mixed with build material 114 in the mixing chamber 120 prior to deposit to form a bodied solvent, and the control device 117 may control the volume, concentration, or other amount of solvent 130 to be mixed with build material 114 in the mixing chamber 120. With a bodied solvent, the granule dissolution rate may be reduced, and the strength of the bonds between granules may be increased. Thus, bodied solvents may be beneficial where deformities caused by excessive dissolution or poor melding are a concern.

The control device 117, 118 and/or one or more controllers 132 may be configured to cause solvent 130 to be deposited over the build material 114 on build platform 110 only after the primer 126 has had sufficient time to soak through the deposited build material 114. For example, the control device 117, 118 may be configured to cause solvent 130 to be deposited several seconds after the primer is deposited. Where primer 126 is pre-mixed with build material 114, the brief soak period may not be necessary.

One or more exemplary solvents may be introduced to the build material 114 by print heads 108, 109 to meld a plurality of granules into one or more desired shapes or structures defining a portion of an object 116. Molecular forces of attraction between molecules from solvent 130 and build material 114 may cause polymer bonds of each outer surface layer of each targeted granule to be broken up, and solvent 130 molecules may penetrate the outer surface layer of each targeted granule. A solvated layer may form between the solvent 130 and each targeted granule interior. Polymer chains may become diffusible across each solvated layer, and polymer chains from adjacent granules may interwind with one another. Solvent 130 molecules may continue to penetrate each targeted granule until each solvated layer reaches a stationary state where high concentrations of suspended polymer chains and/or evaporation and/or removal of solvent 130 prevents further dissolution of build material 114. After the solvent 130 has evaporated or has been removed from the build material 114, interwound polymer chains from adjacent granules may define a continuous, smooth unitary connection between said granules, where said granules have melded to form a unitary portion of an object 116.

An exemplary solvent 130 may comprise one or more chemicals collectively and/or independently having an ability to dissolve one or more thermoplastics, such as at certain temperatures. In certain preferred embodiments, an exemplary solvent may comprise one or more of carbon tetrachloride, decalin, trichloroethylene, cyclohexane, toluene, xylene, or one or more of the forgoing chemicals dissolved in a separate medium. For example, an exemplary solvent may include a commercial xylene mixture comprising m-xylene, no more than 20% o-xylene, no more than 20% p-xylene, and no more than 20% ethylbenzene. As another example, an exemplary solvent may include 0.11 g of trichloroethylene per 100 mL of water. In other preferred embodiments, an exemplary solvent may be a bodied solvent comprising a mixture of thermoplastic material and one or more of carbon tetrachloride, decalin, trichloroethylene, cyclohexane, toluene, xylene, or one or more of the forgoing chemicals dissolved in a separate medium. For example, an exemplary solvent may include 0.3 g of low-density polyethylene powder per 5 mL of a commercial xylene mixture comprising 40-65% m-xylene, no more than 20% o-xylene, no more than 20% p-xylene, and no more than 20% ethylbenzene.

The deposit device 108 may be in fluid communication with a third reservoir 137. The third reservoir 137 may be configured to hold an exemplary diluent 138. A control device 118 may be interposed between the third reservoir 137 and the deposit device 108. The control device 118 may control a volume, concentration, or other amount of diluent 138 to be deposited over the build material 114 on build platform 110. The third reservoir 137 may, alternatively or additionally, be in fluid communication with the mixing chamber 120. The control device 117 may be interposed between the third reservoir 137 and a print head 108, 109. Diluent 138 may be mixed with solvent 130 and/or build material 114 in the mixing chamber 120 prior to deposit, and the control device 117 may control the volume of diluent 138 to be mixed with solvent 130 and/or build material 114 in the mixing chamber 120.

The exemplary diluent 138 may be added to the solvent 130 to inhibit or prevent channel deformation caused by excessive granule dissolution. The diluent 138 may reduce the level or extent of dissolution because the diluent 138 molecules may have a weak molecular force of attraction with respect to polymer molecules of the build material 114. In certain embodiments, the diluent may comprise water. In other embodiments, the diluent may comprise ethanol. In yet other embodiments, the diluent may comprise a mixture of ethanol and water.

In exemplary embodiments, the first reservoir 124, the second reservoir 128, the third reservoir 137, and/or the build material reservoir 136 may comprise one or more heating elements, cooling elements, mixing devices, some combination thereof, or the like.

It is not intended that the present disclosure be limited to the use of two control devices 117, 118. In certain exemplary embodiments, only one control device may be interposed between the reservoirs 124, 128, 137 and at least one print head 108, 109. In other exemplary embodiments, more than two control devices may be interposed between the reservoirs 124, 128, 137 and at least one print head 108, 109. In yet other embodiments, a control device may not be included. Each control device 117, 118 may comprise a valve, filter, pump, gauge, mechanical separator, mechanical flow control device, some combination thereof, or other mechanism(s) configured to limit or otherwise control the amount of fluid moved from a reservoir 124, 128, 137 to a mixing chamber 120 or print head 108, 109. One or more control devices may also be included between the build material reservoir 136 and the mixing chamber 120 or print head 108, 109 to limit or otherwise control the amount of build material 114 moved from the build material reservoir 136 to the build platform 110.

Each control device 117, 118 may be in electronic communication with the one or more controllers 132. The controller(s) 132 may be in electronic communication with one or more sensors. In the FIG. 1 embodiment, a melding sensor 134, a temperature sensor 140, a humidity sensor 142, and a pressure sensor 144 are shown. It is not intended that the present disclosure be limited to the use of the aforementioned sensors 134, 140, 142, 144. Each of the sensors 134, 140, 142, 144 may comprise multiple individual sensors. In certain exemplary embodiments, only some of the aforementioned sensors may be used. In other exemplary embodiments, additional sensors may be used. In yet other embodiments, sensors may not be used.

The melding sensor 134 may comprise a camera, optical sensor, laser, or other device configured to distinguish between fused or separated surfaces, temperatures or other conditions sufficient for melding, combinations thereof, or the like. The melding sensor 134 and/or the controller(s) 132 may comprise machine vision software configured to interpret data from the melding sensor 134. For example, without limitation, the melding sensor 134 and/or the controller(s) 132 may be configured to measure and determine relative smoothness or roughness of the build material 114 after deposition of the solvent 130 and/or other materials (e.g., primer 126 and/or diluent 138). The controller(s) 132 may be configured to make operational adjustments based on the perceived amount of melding. For example, without limitation, amount and/or concentration of the solvent 130 and/or other materials deposited may be increased where a lack of adequate melding is perceived, and an amount and/or concentration of the solvent 130 and/or other materials deposited may be decreased where adequate melding is perceived.

In exemplary embodiments of the present invention, after additional build material 114 is deposited over the build platform 110, such as through the recoater 109, additional layers of solvent 130, and optionally primer 126 and/or diluent 138 may be deposited where the portions of the object 116 forming the next layer are located. The process is repeated to form the entire object 116. Once all layers have been completed, the object 116 is excavated. Such excavation may involve blowing away, grinding, breaking apart, or the like.

The controller(s) 132 may be in electronic communication with one or more databases 133. The database(s) 133 may comprise data indicating one or more amounts, densities, concentrations, some combination thereof, or the like of primer 126, solvent 130, and/or diluent 138 to be deposited, each of which may be associated with one or more of dissolution rates or intervals, solvent 130, build material 114, primer 126, and/or dilutant 138 types, concentrations, amounts, or the like, and/or build conditions including, but not limited to, temperature, humidity, and air pressure levels or ranges. The database(s) 133 may, alternatively or additionally, include time interval information, for example, information about when additional solvent 130 should be deposited over build material 114 if melding does not initially occur.

For example, without limitation, the controller(s) 132 may be configured to take readings from the sensors 134, 140, 142, 144 and/or information supplied as part of the build (e.g., solvent 130, build material 114, primer 126, and/or dilutant 138 types, concentrations, amounts, or the like) and adjust a type, amount, concentration, timing, frequency, or the like of the solvent 130, build material 114, primer 126, and/or dilutant 138 deposited to provide optimal fusion. Such adjustments may be made alternative to, or in combination with, those made in accordance with the melding sensor 134. In other exemplary embodiments, without limitation, the type, amount, concentration, timing, frequency, or the like of the solvent 130, build material 114, primer 126, and/or dilutant 138 may be preprogramed or otherwise user provided.

The melding sensor 134, and/or the controller(s) 132, may, alternatively or additionally, be configured to determine when targeted granules begin to dissolve and meld together after solvent 130 is introduced to build material 114. The melding sensor 134 may signal the controller(s) 132 when granules begin to dissolve and meld together. The controller(s) 132 may be configured to instruct the control device 117, 118 to cause additional solvent 130 to be deposited over targeted build material if melding does not occur after a set amount of time following initial solvent application, such as, but not limited to, 5 seconds. In exemplary embodiments, the controller(s) 132 may transmit information from the database(s) 133 about when additional solvent 130 should be deposited if melding does not occur following initial solvent application. Other operational adjustments may be implemented.

The melding sensor 134, and/or the controller(s) 132, may, alternatively or additionally, be further configured to determine when a stationary state has been reached in build material 114 after solvent 130 introduction. The melding sensor 134 may signal the controller(s) 132 when stationary state has been reached. The controller(s) 132 may be configured to instruct the control device 117, 118 to cause additional build material 114 to be deposited over the build platform 110 by print heads 108, 109 thereafter. The database(s) 133 may indicate to the controller(s) 132 a duration for when stationary state should occur. Other operational adjustments may be implemented.

Where the melding sensor 134 and/or the controller(s) 132 have not yet determined that stationary state has been reached after said duration, the controller(s) 132 may cause a build box temperature unit 146 in direct or electronic communication with the controller(s) 132 to increase the temperature of the build box 102 to increase the evaporation rate of the solvent 130 in build material 114, by way of non-limiting example. Other operational adjustments may be implemented.

The temperature of the build box 102 may also influence the magnitude of molecular force of attraction between granule and solvent molecules. For example, certain solvents may not be able to dissolve polyethylene at low temperatures due to poor attraction between the solvent and polyethene molecules. Thus, the build box temperature unit 146 may be directed by the controller(s) 132 in communication with the database(s) 133 to provide a minimum operating temperature in the build box 102 when certain thermoplastics, such as polyethylene, are being used in build material 114. The build box 102 temperature may preferably be maintained at a cold fusion setting so as to prevent deformation of the object 116.

Alternatively, or additionally, air flow may be directed over the build material 114, such as by a fan 148, to enhance solvent evaporation. If the melding sensor 134 has not indicated to the controller(s) 132 that stationary state has been reached after said duration, the controller(s) 132 may cause the fan 148 to increase air flow over the build material 114. In yet other embodiments, if the melding sensor 134 has not indicated to the controller(s) 132 that stationary state has been reached after said duration, the controller(s) 132 may direct the control unit 117, 118 to cause diluent 138 to be added to the targeted granules to dilute or counteract the solvent 130. In yet other embodiments, diluent 138 may be mixed with solvent 130 in the mixing chamber 120 prior to deposition to prevent a risk of excessive dissolution presented by an amount, density, concentration, type, combination thereof, or the like of chemicals, where said risk may be indicated by the database(s) 133. Certain exemplary embodiments may include some combination of air flow, dilution, temperature, pressure control methods or the like to prevent excessive dissolution of build material 114 and promote proper melding. Other operational adjustments may be implemented.

After additional build material 114 is deposited over the build platform 110, the controller(s) 132 may cause the platform movement device 112 to lower the build platform 110. It is not intended that the present disclosure be limited to the use of melding sensors 134. In other embodiments, additional build material 114 may be deposited over the build platform 110 by a print head 108, 109 after a set amount of time following solvent 130 application.

The temperature sensor 140 may be configured to take readings of ambient air temperature levels, such as within and/or outside of the build box 102. The controller(s) 132 may be directed by the database(s) 133 to cause the build box temperature unit 146 to alter the temperature of air within the build box 102. The temperature sensor 140 electronically communicates build box 102 temperature readings to the build box temperature unit 146. Furthermore, the controller(s) 132 may be configured to look up, at the database(s) 133, the amount, density, concentration, type, ingredients, properties, combinations thereof, or the like of primer 126, solvent 130, and/or diluent 138 to be deposited based upon the temperature readings from the temperature sensor 140. Other operational adjustments may be implemented.

The humidity sensor 142 may be configured to take readings of ambient humidity levels. The controller(s) 132 may be configured to look up, at the database(s) 133, the amount, density, concentration, type, ingredients, properties, combinations thereof, or the like of primer 126, solvent 130, and/or diluent 138 to be deposited based upon the humidity readings from the humidity sensor 142. Other operational adjustments may be implemented.

The pressure sensor 144 may be configured to take pressure readings within the build material 114 on build platform 110. The controller(s) 132 may be configured to cause a pressure control apparatus, including, but not limited to, a tamp, piston, pump, combinations thereof, or the like, to alter the pressure within the build material 114 on the build platform 110. Increasing pressure on targeted build material after solvent 130 deposition may increase the strength of bonds between granules forming a portion of the object 116. Alternatively, or additionally, the pressure sensor 144 may comprise a barometer and/or be configured to take pressure readings of air within the build box 102. The controller(s) 132 may be configured to cause a pressure control apparatus, including, but not limited to, a fan, pump, combinations thereof, or the like. In such embodiments, the build box 102 may be fully or partially sealed such that air may be added or removed to affect air pressure within the build box 102.

In exemplary embodiments, without limitation, the database(s) 133 may communicate, such as upon query, various operational criteria to the controller(s) 132. Such criteria may include, for example, without limitation, a minimum pressure, temperature, humidity, amount, density, concentration, type, combination thereof, or the like of the primer 126, solvent 130, and/or diluent 138 to be deposited. Alternatively, or additionally, the controller(s) 132 may be configured to look up, at the database(s) 133, the temperature, humidity, amount, density, concentration, type, combination thereof, or the like of the primer 126, solvent 130, and/or diluent 138 to be deposited based upon readings from the sensors 134, 140, 142, 144. Operations may be continuously or periodically adjusted, such as based on feedback from the melding sensor 134 and/or changing conditions within the build box 102.

The controller(s) 132 may be in electronic communication with one or more of: the vertical movement device 104, the horizontal movement device 106, the deposit device 108, the platform movement device 112, the second horizontal movement device 107, and the recoater 109. The controller(s) 132 may, alternatively or additionally, be configured to control movement of the primer 126, solvent 130, and/or diluent 138, such as, but not limited to, by way of the control devices 117, 118 and/or associated equipment.

The controller(s) 132 may be configured to accept one or more computer aided design ("CAD") files and/or other build data. The controller(s) 132 may be configured to extract certain information from the build data. Such information may include, but is not necessarily limited to, object shape, concentration, amount, or the like of the primer 126, solvent 130, and/or diluent 138 to be used, combination thereof, or the like. Alternatively, or additionally, certain such information, such as, but not limited to, type, concentration, amount, or the like of the primer 126, solvent 130, and/or diluent 138 to be used may be preprogrammed or determined otherwise.

The controller(s) 132 may be configured to control movement of the depositing device 108, the recoater 109, and/or the build platform 110 to control the location the build material 114, the primer 126, the solvent 130, and/or the diluent 138 is deposited to form an object 116. Movement of the depositing device 108 may be controlled by way of the vertical and/or horizontal movement devices 104, 106. Movement of the recoater 109 may be controlled by way of the vertical and/or second horizontal movement devices 104, 107. Movement of the build platform 110 may be controlled by way of the platform movement device 112.

A drainage system 111 may be provided in fluid communication with some or all of the build box 102. In exemplary embodiments, the drainage system 111 comprises one or more drains provided around some or all of the build box 102. The drainage system 111 may facilitate the drainage of remaining build material 114, i.e., the unbound build material 114 not melded by solvent 130 and/or forming the object 116.

The various reservoirs, such as, but not limited to, the first reservoir 124, the second reservoir 128, the third reservoir 137, and the build material reservoir 136, described herein may be located remote from the build box 102 and be connected thereto by way of one or more tubes, pipes, valves, passageways, ductwork, some combination thereof, or the like. Various other components, such as, but not limited to, the controller(s) 132, the control devices 117, 118, the mixing chamber 120, the sensors 134, 140, 142, 144 and the one or more database(s) 133 may be located remote from the build box 102 and be in physical or electrical connection with the build box 102. Any component described herein may be located remote from one another.

Figure 2:
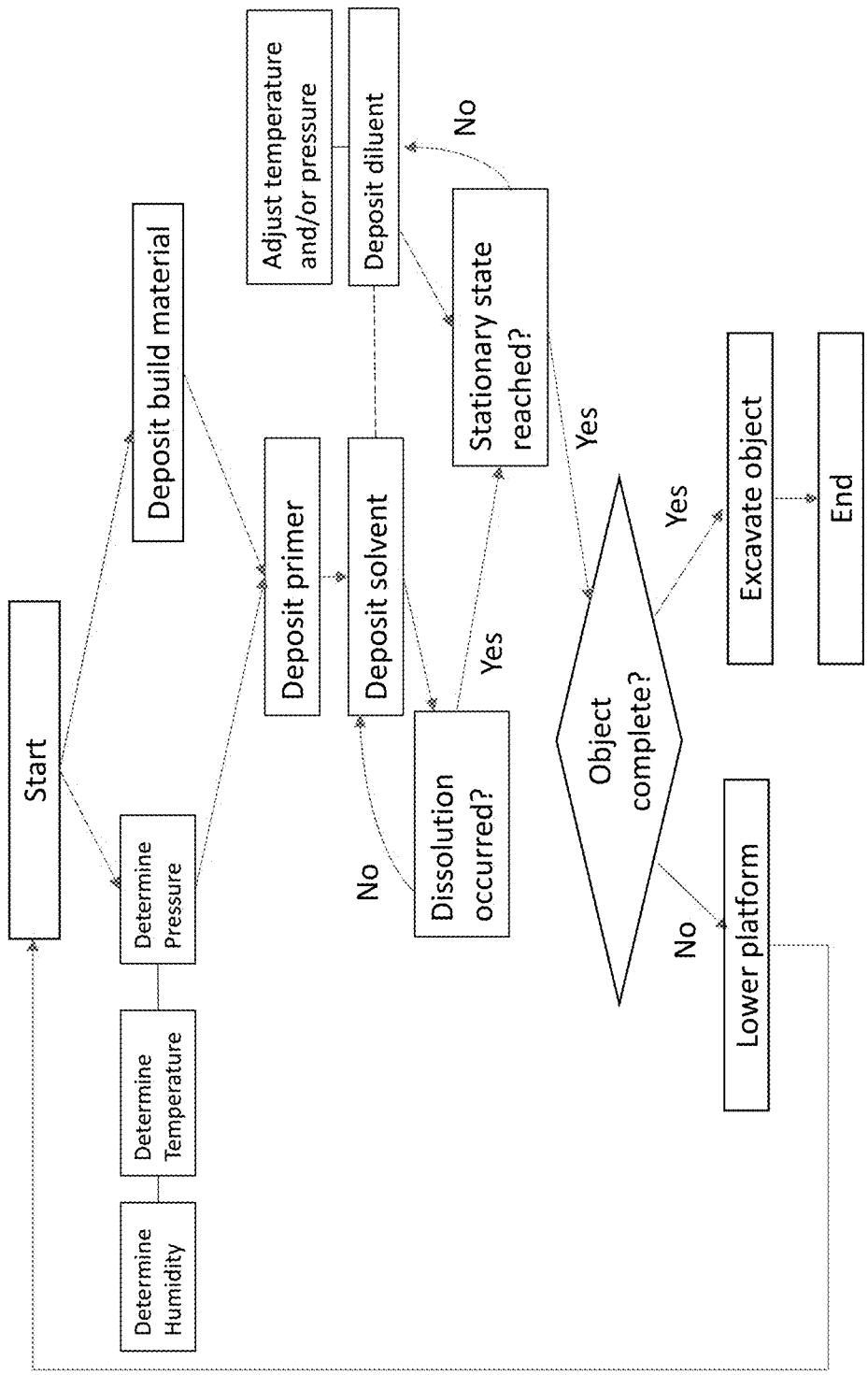
FIG. 2 is a flowchart with exemplary logic for operating the additive manufacturing machine of FIG. 1 in accordance with the present invention.

FIG. 2 illustrates exemplary logic for operating the additive manufacturing machine 100. The build material 114 may be placed within the build box 102. The build material 114 may be deposited by the deposit device 108, the recoater 109, be pre-deposited, some combination thereof, or the like. In exemplary embodiments, the build material 114 is deposited on the build platform 110, such as initially directly thereon and subsequently on prior layers of deposited material.

At the same time, or after the build material 114 has been deposited, the controller(s) 132 may be configured to take one or more temperature, humidity and/or pressure readings from the respective sensors 140, 142, 144. Such readings may be taken at any point, continuously, periodically, randomly, combinations thereof, or the like. Where more than one reading is utilized for a single time or time interval, the controller(s) 132 may be configured to take an average of, or otherwise combine or select a single one of, the various temperature, humidity and/or pressure level readings. The controller(s) 132 may be configured to look up, at the database(s) 133, the amount, density, concentration, type, ingredients, properties, combinations thereof, or the like of primer 126, solvent 130 and/or diluent 138 to be deposited based upon the temperature, humidity and/or sensor readings from the respective sensors 140, 142, 144. In exemplary embodiments, the controller(s) 132 may transmit the temperature, humidity and/or sensor levels determined from the sensors 140, 142, 144 to the database(s) 133, and the database(s) 133 may retrieve and transmit the corresponding primer 126, solvent 130 and/or diluent 138 amounts, densities, concentrations, types, ingredients, properties, combinations thereof, or the like to be deposited on the deposited build material 114. Adjustments to the same may be made as additional readings are taken and processed.

Deposit of the primer 126, solvent 130 and/or diluent 138 may be made by way of a print head 108, 109 or other deposit device. In some embodiments, the primer 126 and/or diluent 138 may be deposited over the entire build box 102 and allowed to soak into the deposited build material 114 such that substantially all of the deposited build material 114 is soaked with primer 126 and/or diluent 138. In other exemplary embodiments, the deposit of the primer 126 and/or diluent may be made at the mixing chamber 120 or otherwise with the build material 114 prior to deposit within the build box 102. In yet other exemplary embodiments, the deposit of the primer 126 and/or diluent 138 may be limited to portions of the object 116 being formed.

The controller(s) 132 may be configured to cause the solvent 130 to be deposited on the areas of the build material 114 corresponding to portions of the object 116 being formed. The solvent 130 is preferably deposited after the primer 126 is deposited on the build material 114 and allowed to soak into the build material 114, though any timing is permitted. The solvent 130 may be diluted, such as by the diluent 138 at a mixing chamber 120 prior to deposit, though such is not required.

A melding sensor 134 may signal to the controller(s) 132 when build material 114 begins to dissolve and meld together after solvent 130 is introduced to the build material 114. The controller(s) 132 may be configured to instruct the control device 117, 118 to cause additional solvent 130 to be deposited over portions of the object 116 being formed if melding does not occur after a set amount of time following initial solvent application. Where said dissolving and melding do occur, the melding sensor 134 may be configured to determine when a stationary state has been reached in the dissolution of build material 114. Where the melding sensor 134 has not indicated to the controller(s) 132 that stationary state has been reached after a certain set duration, the controller(s) 132 may cause temperature or pressure in the build box 102 to be adjusted, or diluent 138 to be deposited to targeted build material to prevent excessive dissolution of the granules. Where stationary state has been reached, the additive manufacturing machine 100 proceeds based on whether or not the object 116 is complete.

Alternatively, or additionally, the melding sensor 134 may be configured to determine an amount or level of fusion after some or all steps in the build process (e.g., a period of time after solvent 130 is deposited). Adjustments may be made to subsequent operations, such as by the controller(s) 132 based on the level of fusion achieved. For example, without limitation, where inadequate fusion is perceived, additional solvent 130, and/or solvent 130 of a higher concentration by way of non-limiting examples, may be deposited before or after a next layer of the build material 114 is deposited.

If the object 116 is not yet completed, the build platform 110 may be lowered and an additional layer of the build material 114 may be deposited. Preferably, the build material 114 is deposited by the recoater 109 from material in the build material reservoir 136. The remaining build material 114, i.e., the unbound build material 114 not forming the object 116, may be allowed to flow into the drainage system 111. In this way, the remaining build material 114 may be continuously removed from the build box 102. Alternatively, or additionally, the drainage system 111 may only be accessed once the object 116 is wholly or partially completed.

If the object 116 is completed, the object 116 may be excavated as needed from any remining, excess build material 114. Such excavation efforts may include, but are not necessarily limited to, drainage of the remaining build material 114 through the drainage system 111. Alternatively, or additionally, such drainage and/or excavation may occur or be performed throughout the build process.

While discussion is made herein primarily with regards to 3-D printing, other types of additive manufacturing are contemplated. The fluid communication described herein may be achieved by one or more tubes, pipes, valves, joints, ductwork, some combination thereof, or the like. Any components of the machine 100 may be local to, or remote from, the machine 100 and particularly the build box 102.

Any of the steps shown and/or described herein may be omitted, repeated, and/or performed in any order with additional steps interposed, though such is not necessarily required.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for printing a manufacturing object by additive manufacturing using solvent melding, said apparatus comprising:

a build box;
a build material reservoir holding granulized build material;
a recoater connected to said build material reservoir;
a solvent reservoir holding at least one solvent configured to meld the build material;
a printhead configured for at least two-dimensional movement within the build box and in fluid connection with the solvent reservoir;
a melding control subsystem comprising:
  a control device fluidly interposed between the solvent reservoir and the printhead;
  a database comprising solvent amounts associated with humidity levels;
  a humidity sensor located within the build box; and
one or more controllers in electronic communications with said a melding control subsystem and comprising software instructions stored at one or more electronic storage devices, which when executed, configure one or more processors to:
  receive uploaded build data for said manufacturing object;
  command said recoater to individually deposit multiple layers of said granulized build material within the build box;
  command said printhead to, individually and after each of said multiple layers of said granulized build material are deposited by said recoater, deposit said at least one solvent at areas of each respective one of said multiple layers of said granulized build material in accordance with said build data;
  receive humidity readings from said humidity sensor;
  query said database to retrieve the solvent amount associated with the humidity level matching the humidity reading; and
  adjust operations of the control device to provide an amount of the at least one solvent from the solvent reservoir consistent with the solvent amount retrieved from the database.

2. The apparatus of claim 1 further comprising:
a dilution fluid reservoir holding a dilution fluid, wherein said printhead is in fluid connection with the dilution fluid reservoir, and wherein said dilution fluid is free of the solvent or another solvent;
an electronically controllable fluid control device fluidly interposed between the dilution fluid reservoir, the solvent reservoir, and the printhead;
a mixing chamber fluidly interposed between said electronically controllable fluid control device and the printhead; and
additional software instructions stored at the one or more electronic storage devices of the one or more controllers, which when executed, configure the one or more processors to, prior to each instance of depositing said at least one solvent within said build box:
  command, by way of the electronically controllable fluid control device, drawing of the at least one solvent from the solvent reservoir into the mixing chamber; and
  command, by way of the electronically controllable fluid control device, drawing of the dilution fluid from the dilution fluid reservoir into the mixing chamber for mixing with the at least one solvent drawn into the mixing chamber such that said at least one solvent is diluted prior to deposition within said build box.

3. The apparatus of claim 1 further comprising:
a primer reservoir holding a primer for the solvent and in fluid communication with the printhead; and
additional software instructions stored at the one or more electronic storage devices of the one or more controllers, which when executed, configure the one or more processors to, prior to each instance of depositing said at least one solvent within said build box, command said printhead to, individually and after each of said multiple layers of said granulized build material are deposited by said recoater, deposit said primer at areas of each respective one of said multiple layers of said granulized build material in accordance with said build data.

4. The apparatus of claim 1 further comprising:
a primer reservoir holding a primer for the solvent and in fluid communication with the recoater or printhead; and
additional software instructions stored at the one or more electronic storage devices of the one or more controllers, which when executed, configure the one or more processors to, prior to each instance of depositing said multiple layers of said build material within said build box, command, by way of said recoater or said printhead, deposit of the primer on the build material deposited within said build box.

5. The apparatus of claim 1 further comprising:
a temperature sensor located within the build box and forming part of said melding control subsystem;
a temperature control unit located within the build box, forming part of said melding control subsystem, and comprising one or more of a heater and a fan; and
additional software instructions stored at the one or more electronic storage devices of the one or more controllers, which when executed, configure the one or more processors to:
  query the database to retrieve a predetermined temperature range for the build material;
  receive temperature readings from the temperature sensor; and
  adjust the temperature control unit to achieve temperature readings within the predetermined temperature range.

6. The apparatus of claim 1 further comprising:
a camera forming part of said melding control subsystem; and
machine vision software forming part of said melding control subsystem and configured to determine surface smoothness from images captured by said camera.

7. The apparatus of claim 1 further comprising:
one or more sensors forming part of said melding control subsystem;
one or more databases in electronic communication with the one or more controllers and comprising data regarding optimal deposit concentrations for various solvents at various conditions; and
additional software instructions stored at the one or more electronic storage devices of the one or more controllers, which when executed, configure the one or more processors to:
  determine a type of the build material utilized and a type of the at least one solvent utilized;
  determine said conditions by way of said melding control subsystem;
  query the one or more databases to determine an optimal deposit concentration for said at least one solvent based on said conditions; and operate said control device to provide said deposit of said at least one solvent at the optimal deposit concentration within said build box.

8. The apparatus of claim 7 wherein:
said one or more sensors comprise: a temperature sensor, a humidity sensor, and a barometer;
said conditions comprise temperature, humidity, and air pressure; and
said type of the build material utilized and said type of the at least one solvent utilized is extracted from said build data.

9. The apparatus of claim 1 further comprising:
a moveable build platform within said build box in electronic communication with said one or more controllers; and
a drainage system connected to said build box configured to permit drainage of leftover portions of the build material not forming part of said manufacturing object.

10. An apparatus for printing a manufacturing object by additive manufacturing using solvent melding, said apparatus comprising:
a build box;
a build material reservoir holding granulized build material;
a recoater connected to said build material reservoir;
a solvent reservoir holding at least one solvent configured to meld the build material;
a printhead configured for at least two-dimensional movement within the build box and in fluid connection with the solvent reservoir;
a melding control subsystem comprising:
a control device fluidly interposed between the solvent reservoir and the printhead;
one or more sensors comprising a temperature sensor, a humidity sensor, and a barometer;
one or more databases comprising data regarding optimal deposit concentrations for various solvents at various conditions, said conditions comprising temperature, humidity, and air pressure; and
one or more controllers in electronic communication with said a melding control subsystem and comprising software instructions stored at one or more electronic storage devices, which when executed, configure one or more processors to:
receive uploaded build data for said manufacturing object;
command said recoater to individually deposit multiple layers of said granulized build material within the build box;
determine a type of the build material utilized and a type of the at least one solvent utilized by extraction from the build data;
determine said conditions by way of said melding control subsystem;
query the one or more databases to determine an optimal deposit concentration for said at least one solvent based on said conditions; and
command said printhead to, individually and after each of said multiple layers of said granulized build material are deposited by said recoater, deposit said at least one solvent at areas of each respective one of said multiple layers of said granulized build material in accordance with said build data while also operating said control device to provide said deposit of said at least one solvent at the optimal deposit concentration within said build box.

11. The apparatus of claim 10 further comprising:
a dilution fluid reservoir holding a dilution fluid, wherein said printhead is in fluid connection with the dilution fluid reservoir, and wherein said dilution fluid is free of the solvent or another solvent;
an electronically controllable fluid control device fluidly interposed between the dilution fluid reservoir, the solvent reservoir, and the printhead;
a mixing chamber fluidly interposed between said electronically controllable fluid control device and the printhead; and
additional software instructions stored at the one or more electronic storage devices of the one or more controllers, which when executed, configure the one or more processors to, prior to each instance of depositing said at least one solvent within said build box:
command, by way of the electronically controllable fluid control device, drawing of the at least one solvent from the solvent reservoir into the mixing chamber; and
command, by way of the electronically controllable fluid control device, drawing of the dilution fluid from the dilution fluid reservoir into the mixing chamber for mixing with the at least one solvent drawn into the mixing chamber such that said at least one solvent is diluted prior to deposition within said build box.

12. The apparatus of claim 10 further comprising:
a primer reservoir holding a primer for the solvent and in fluid communication with the printhead; and
additional software instructions stored at the one or more electronic storage devices of the one or more controllers, which when executed, configure the one or more processors to, prior to each instance of depositing said at least one solvent within said build box, command said printhead to, individually and after each of said multiple layers of said granulized build material are deposited by said recoater, deposit said primer at areas of each respective one of said multiple layers of said granulized build material in accordance with said build data.

13. The apparatus of claim 10 further comprising:
a primer reservoir holding a primer for the solvent and in fluid communication with the recoater or printhead; and
additional software instructions stored at the one or more electronic storage devices of the one or more controllers, which when executed, configure the one or more processors to, prior to each instance of depositing said multiple layers of said build material within said build box, command, by way of said recoater or said printhead, deposit of the primer on the build material deposited within said build box.

14. The apparatus of claim 10 further comprising:
a temperature sensor located within the build box and forming part of said melding control subsystem;
a temperature control unit located within the build box, forming part of said melding control subsystem, and comprising one or more of a heater and a fan; and
additional software instructions stored at the one or more electronic storage devices of the one or more controllers, which when executed, configure the one or more processors to:
query the database to retrieve a predetermined temperature range for the build material;
receive temperature readings from the temperature sensor; and adjust the temperature control unit to achieve temperature readings within the predetermined temperature range.

15. The apparatus of claim 10 further comprising:

a camera forming part of said melding control subsystem; and machine vision software forming part of said melding control subsystem and configured to determine surface smoothness from images captured by said camera.

16. The apparatus of claim 10 further comprising:

a moveable build platform within said build box in electronic communication with said one or more controllers; and a drainage system connected to said build box configured to permit drainage of leftover portions of the build material not forming part of said manufacturing object.

* * * * *